United States Patent
Bowman et al.

(10) Patent No.: US 6,829,825 B1
(45) Date of Patent: Dec. 14, 2004

(54) PROCESS OF MANUFACTURING A CORNER ASSEMBLY

(75) Inventors: James Darwin Bowman, Adams, TN (US); Jeffery Adam Kalmbach, Clarksville, TN (US); David Thomas Sadanowicz, Canton, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/355,409

(22) Filed: Jan. 31, 2003

(51) Int. Cl.[7] .............................................. B21D 53/26
(52) U.S. Cl. .............. 29/894.32; 29/894.3; 29/894.321; 29/894.361; 29/894.362; 301/105.1
(58) Field of Search .......................... 29/894.32, 894.3, 29/894.31, 894.361, 894.362, 898.07, 898.09, 894.322, 894.321; 301/105.1

(56) References Cited

U.S. PATENT DOCUMENTS

| | | | | |
|---|---|---|---|---|
| 5,842,388 A | * | 12/1998 | Visser et al. .................. | 82/1.11 |
| 5,918,707 A | * | 7/1999 | Saunders, III ............. | 188/18 A |
| 6,415,508 B1 | * | 7/2002 | Laps ..................... | 29/894.362 |
| 6,450,584 B2 | * | 9/2002 | Brinker et al. ............ | 301/105.1 |
| 6,485,109 B2 | * | 11/2002 | Brinker et al. ........... | 301/105.1 |
| 6,523,909 B1 | * | 2/2003 | Nakamura et al. ........ | 301/105.1 |
| 6,575,637 B1 | * | 6/2003 | Tajima et al. ................ | 384/544 |
| 6,634,266 B2 | * | 10/2003 | Brinker et al. ................ | 82/168 |
| 6,672,679 B2 | * | 1/2004 | Kaneko .................... | 301/105.1 |
| 6,702,398 B2 | * | 3/2004 | Laps ....................... | 301/105.1 |
| 2002/0066185 A1 | * | 6/2002 | Loustanau et al. ....... | 29/898.06 |
| 2004/0010915 A1 | * | 1/2004 | Mazur et al. .............. | 29/894.3 |
| 2004/0010916 A1 | * | 1/2004 | Mazur et al. .............. | 29/894.3 |

* cited by examiner

*Primary Examiner*—Essama Omgba
(74) *Attorney, Agent, or Firm*—Leo H. McCormick, Jr.; Warren Comstock

(57) ABSTRACT

A process for manufacturing a corner assembly for a vehicle. A wheel hub is partially machined to define a journal section and a radial mounting flange on an out-board surface of the hub. Bolts are pressed into axial openings in the mounting flange and the hub further machining to produce a concentric wheel pilot, rotor pilot and bearing journal surfaces that are perpendicular to radial faces on an out-board surface of the mounting flange. The hub is pressed into a bearing retained of a support member and a rotor is placed on the rotor pilot surface such that the bolts extend through openings located on the inner peripheral surface of the rotor. The hub is rotated to gage lateral deflection with respect to its axis. If the deflection is less than 0.06 mm, the wheel hub and rotor are accepted for installation on a vehicle and rejected if greater that 0.06 mm.

5 Claims, 3 Drawing Sheets

PROCESS OF MANUFACTURING A CORNER ASSEMBLY

This invention relates to a process of manufacturing a corner assembly for a vehicle with a wheel hub to maintain a rotor in perpendicular alignment with the axis of the wheel hub.

BACKGROUND OF THE INVENTION

In vehicles currently manufactured, it is not uncommon for disc brakes to be installed on all four corners of the vehicle wherein a rotor is rotated by a corresponding wheel on the vehicle. The wheel is mounted on a hub that is retained in a bearing that is fixed to a support member secured to the frame of the vehicle. A brake application is effected by moving first and second friction pads retained in a caliper member into engagement with opposing first and second surfaces on the rotor. In disc brake systems, it is important that the first and second friction pads and the rotor are maintained in a perpendicular relationship otherwise during a revolution of rotation of a rotor the clearance, commonly referred to as "lateral runout", between the first and second friction pads can vary and adversely effect a smooth brake application. The effect of lateral runout is sensed by an operator as a surging action or movement on a brake pedal.

In an effort to maintain and effect a perpendicular relationship between a wheel hub and brake components, U.S. Pat. No. 5,842,388 disclosed a process of conjugate machining a rotor and a wheel hub. This process functions in an adequate manner for original equipment that are installed in the manufacture of a new vehicle, unfortunately wear conditions may make it necessary to replace the rotor. Thereafter, when an original rotor is replaced with a new rotor manufacturing tolerances may be cumulative and result in a stack up of tolerances such that an unacceptable "lateral runout" may occur with a mixture of new and old components in a disc brake.

In investigating "lateral runout" is was perceived that when lug bolts are pressed into pre-drilled openings in a wheel hub some distortion occurs in the material surrounding the openings in wheel rotor. Unfortunately the distortion of each individual opening is different and as a result when a new rotor is mounted on an old wheel hub even though within manufacturing tolerances a particular disc brake assembly for a corner assembly may not be acceptable with respect to lateral runout.

SUMMARY OF THE INVENTION

A primary object of the present invention is to provide a process of manufacturing a corner assembly for a vehicle wherein lateral run out between first and second friction faces and a rotor is minimized and at an acceptable level for a brake system whether the rotor is initially installed on a wheel hub by a manufacturer or later replaced with a different rotor by an owner.

According to this process, a wheel hub is selected from a source that has a cylindrical body with a first end and a second end, an axial bore that extends there through, a radially extending mounting flange that is located between the first end and the second end and a plurality of axial openings with a first diameter located at a fixed radial distance from the axis of the axial bore. The wheel hub is placed in an arbor and rotated to partially finish the cylindrical body to define a journal section that extend from the second end toward the mounting flange while the mounting flange is finished to define an inboard face toward the journal section and an out board face toward the first end and machine a radial groove in the out board face of the mounting flange that has a width greater than the diameter of the axial openings. The partially finished wheel hub is removed from the arbor and a bolt is pressed into each of the plurality of axial openings in the flange of the wheel hub to bring a head thereon into engagement with the inboard face of the mounting flange. Thereafter, the wheel hub with the bolts attached thereto is returned to the arbor and rotated to complete the finishing of the wheel hub by machining material therefrom to define: a wheel pilot surface adjacent the first end; a rotor pilot surface adjacent the wheel pilot surface; a bearing surface in the journal section; a first radial face that extends from the rotor pilot surface to the radial groove; and a second radial face that extends from the radial groove to a peripheral surface on outboard surface of the mounting flange to define a hub assembly. The hub assembly is characterized in that the defined wheel pilot surface, rotor pilot surface and bearing surface are concentric to the axial bore of the wheel hub while the first and second radial faces are perpendicular to the axial bore. The hub assembly is thereafter pressed into a bearing retained in a support member that is designed to be fixed to a vehicle. Subsequently, a first rotor is obtained from a source and defined by a second plurality of openings that are located adjacent an inner peripheral surface and first and second opposing friction surfaces located adjacent an outer peripheral surface. The inner peripheral surface of the rotor is located on the rotor pilot surface such that the plurality of bolts correspondingly extend through the second plurality of openings. Later a wheel obtained from a source and defined by a center opening is located on the wheel pilot such that the plurality of bolts extend through a corresponding third plurality of openings in the wheel. When a nut is attached to each bolt of the plurality of bolts an alignment surface on the first rotor is brought into engagement with the first and second radial faces on outboard face of the mounting flange to align the first and second opposing friction surfaces on the rotor in a plane perpendicular to the axis of the hub assembly to define a corner assembly. Prior to the attachment of the wheel to the corner assembly, the wheel hub and knuckle are evaluated by measuring the perpendicular alignment of the first and second opposing friction surfaces of a rotor with respect to the axis of the hub assembly through a gaging operation. The gaging measures expected lateral change in the rotor with respect to the first and second friction surfaces during a revolution of rotation of the rotor. If a gaged lateral change is less that 0.06 mm the corner assembly is accepted and if greater than 0.06 mm the corner assembly is initially rejected. After an initial rejection of a corner assembly resulting from excessive lateral runout, rather that discard the corner assembly, the first rotor is removed from the wheel hub and rotated such that the plurality of bolts are located in different openings to complete a re-assembly of the corner assembly. The re-assembled corner assembly is again reevaluated by rotating the wheel hub repeating the gaging measurement of expected lateral movement of the first and second friction surfaces and the rotor. If the lateral change of the re-assembled corner assembly is less than 0.06 mm the corner assembly is now accepted and it if more than 0.06 mm the corner assembly is finally rejected. After a final rejection of this re-assembled corner assembly, the first rotor is removed from the hub assembly and a second rotor is obtained from the source. The second rotor is placed on the wheel hub and the wheel reattached to the wheel hub to complete a second re-assembly of the corner assembly. The wheel hub is rotating and the gaging measurement is taken to determine its lateral change. If the lateral change is less that 0.06 mm this second re-assembled corner assembly is accepted, however it the change is more that 0.06 mm it is assumed that the tolerance stack up of the components contributes to a lateral runout that is unacceptable for a corner assembly.

An advantage of this invention resides in a process of manufacturing a wheel hub for a corner assembly wherein compatibility with a rotor is enhanced to achieve minimal lateral runout between when an initial rotor in a disc brake is replaced with a second rotor.

A further advantage of this invention resides in a process of partially finishing a wheel hub and installing mounting studs on a flange before finally finishing the surfaces thereon to achieve a perpendicular relationship between a bearing journal, wheel pilot surface, rotor pilot surface and a outboard face on a mounting flange.

DETAILED DESCRIPTION

Figure 1:
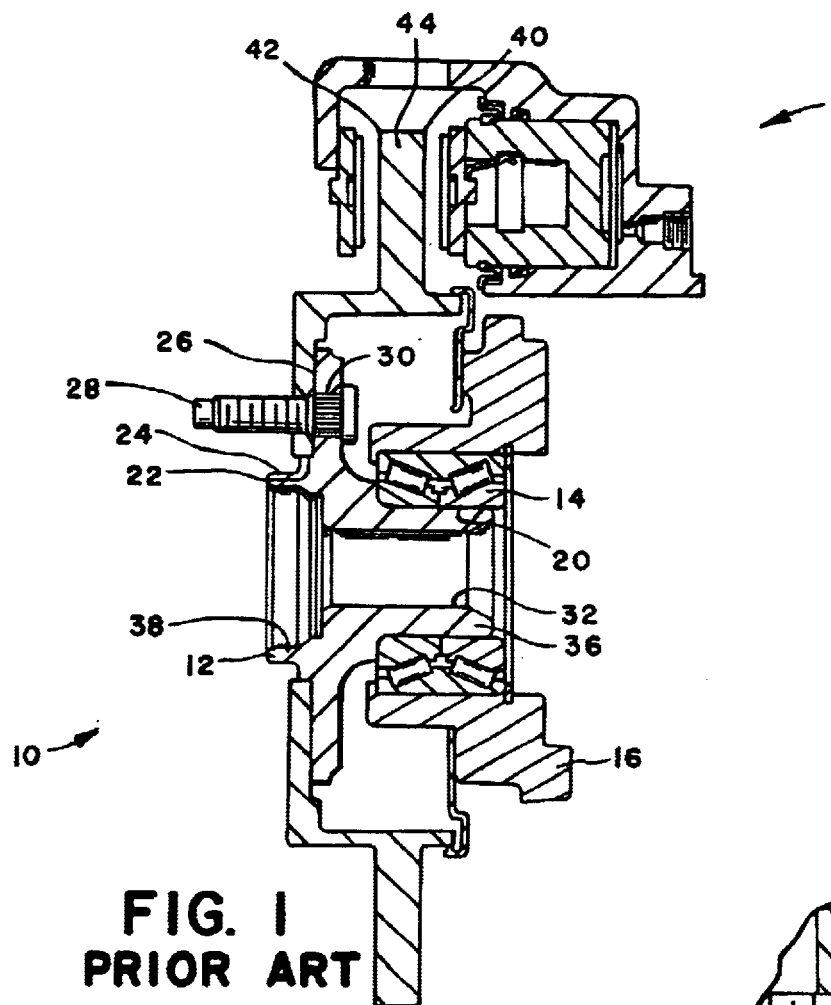
FIG. 1 is an illustration of a corner assembly for a vehicle in the prior art.

FIG. 1 illustrates a corner assembly 10 for a vehicle wherein a wheel hub 12 is attached to a bearing 14 retained in an anchor or knuckle 16 of a disc brake 18.

Figure 2:
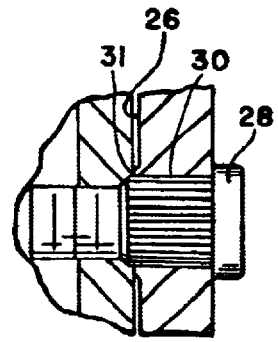
FIG. 2 is an enlarged view of the circumscribed section of FIG. 1 showing an outboard face on a mounting flange of a wheel hub with a bolt pressed into a radial extending flange.

The corner assembly 10 is manufactured by obtaining a forged wheel hub 12 from a source and various surfaces machined into therein including a journal surface 20 for bearing 14, rotor pilot surface 22, wheel pilot surface 24 and mounting flange 26. Once the various surfaces are machined, mounting studs 28,28' . . . 28" (only one being shown) are pressed into corresponding pre-drilled openings 30,30' . . . 30" (only one being shown) in the mounting flange 26. The openings 30,30' . . . 30" being located at a fixed distance from the axis of bore 32 that extends from a first end 36 to a second end 38. When the mounting studs 28,28' . . . 28" are pressed into the mounting flange 26 it is possible that some of the material that surrounds any or all of openings 30,30' . . . 30" may be distorted in a manner as illustrated in FIG. 2. The distorted area 31 for an individual opening 30 is not identical for a distorted area for any other opening 30' and as a result the relationship between a the distorted areas the out board surface for mounting flange 26 may eventually effect a desired perpendicular relationship between the axis of the wheel hub 12 and first 40 and second 42 friction surfaces on a rotor 44 when the rotor 44 is placed on the rotor pilot surface 22 to define a corner assembly 10.

It has been suggested that a groove may be machined in the outboard surface of the mounting flange 26 during the finishing of the wheel hub 12 to provide a relief for the material 31 that is later distorted on pushing the mounting studs 28,28' . . . 28" on to the flange 26 but this does not provide assurance that the relationships between the various finished surface and a rotor would achieve a desired perpendicular alignment between a rotor and first and second friction pads in the disc brake 18.

Figure 9:
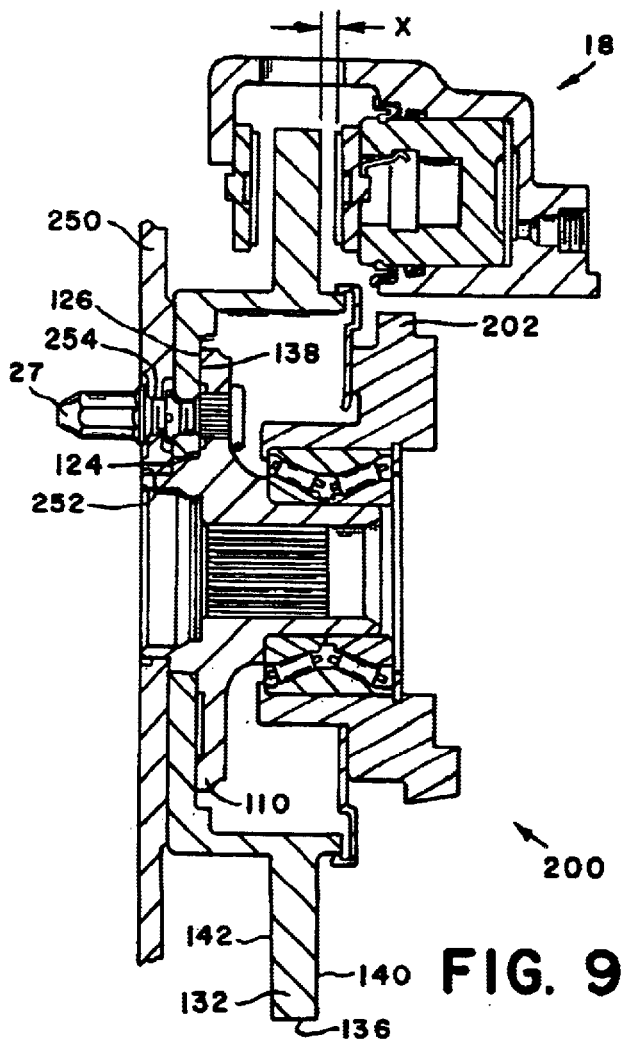
FIG. 9 illustrates a sixth step where a wheel is secured to the wheel hub of FIG. 8 to complete the assembly of FIG. 8 and define a corner assembly according to the present invention.

It has been determined that an important feature in maintaining the desired relationship is dependent on the relationship of the various functional surfaces on a wheel hub member in maintaining the perpendicular alignment between a rotor and first and second friction pads in a disc brake and in particular when an initial rotor is replaced with a second rotor in a corner assembly 10. In the present invention, the wheel hub 100, shown in FIG. 3, is manufactured and assembled into to a corner assembly 200, shown in FIG. 9, in a manner to enhance the maintenance of a desired parallel relationship between a rotor and first and second friction pads whether the rotor is an initial installation during the manufacture of the vehicle or replaced at a later date.

Figure 3:
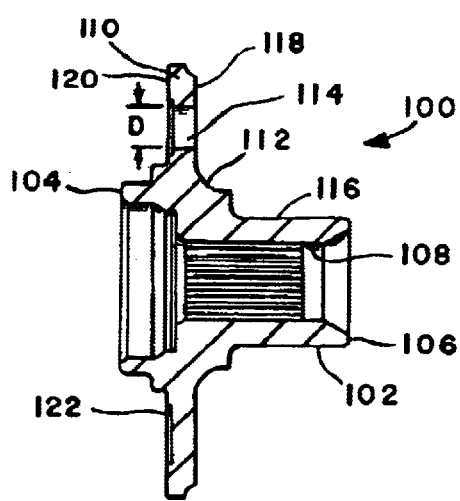
FIG. 3 is a wheel hub with a splined bore for use in the a corner assembly of the present invention.
Figure 4:
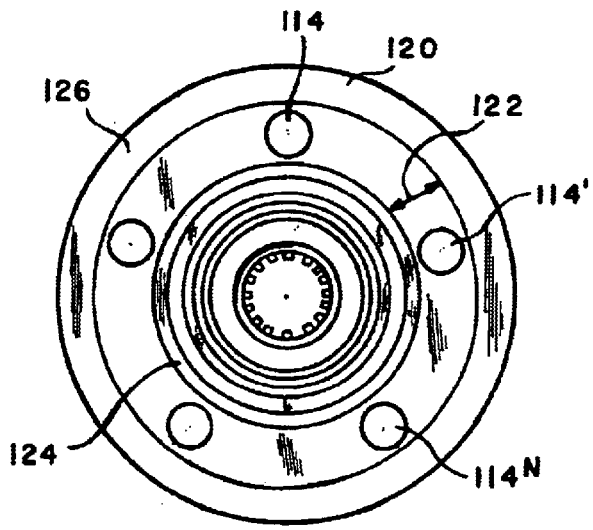
FIG. 4 illustrates a first step wherein the wheel hub of FIG. 3 is partially finished to define a relief groove in a radially extending flange of the wheel hub.

In particular, a wheel hub 100, as shown in FIGS. 3 and 4, is forged into a general desired configuration in a first manufacturing process to provide a source. The wheel hub 100 is defined by a cylindrical body 102 a first end 104 and a second end 106 and a axially splined bore 108 that extends from the first end 104 to the second end 106. A mounting flange 110 located between the first end 104 and the second end 106 that radially extends from peripheral surface 112 of the cylindrical body 102 has a plurality of axial openings 114, 114' . . . 114", see FIG. 4, located a fixed radial distance from the axis of the splined bore 108. The axial openings 114, 114' . . . 114" have a first diameter D. A forged wheel hub 100 is placed on an arbor and the cylindrical body 102 partially finished to define a journal section 116 that extends from the second end 106 toward the mounting flange 110 and partially finishing the mounting flange 110 to define an inboard face 118 toward journal section 116 and an out board face 120 toward the first end 104. At the same time a arcuate radial groove 122 that incorporates or covers the plurality of axial openings 114, 114' . . . 114" is machined in the out board face 120 of the mounting flange 110 to define a first alignment surface 124 and a second alignment surface 126. The width of the radial groove 122 exceeds diameter D of the plurality of axial openings 114, 114' . . . 114" by an amount equal to a determined distortion, typically about 5 percent. Thus, the width of the radial groove 122 is equal to 1.05 D while the depth of the radial groove is typically about 0.5 mm.

Figure 5:
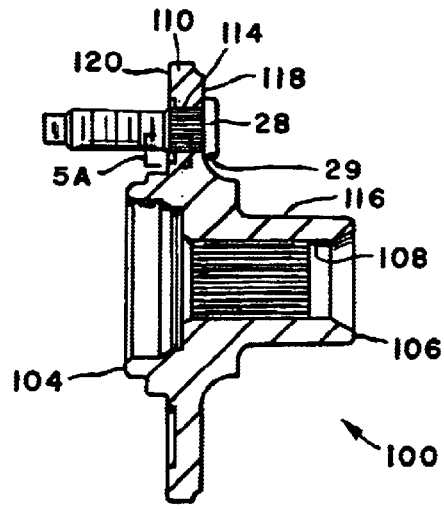
FIG. 5 illustrates a second step of the wheel hub of FIG. 4 wherein a plurality of bolts are pressed into corresponding axial holes located in an radial plane of the relief groove.
Figure 5A:
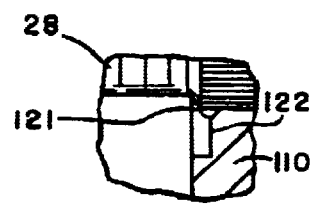
FIG. 5a is an exploded view of the groove area of FIG. 5 with a stud pressed into the mounting flange.

The partially finished wheel hub 100 is removed from arbor and transferred to a station, illustrated in FIGS. 5 and 5a, where a mounting stud or bolt 28 is pressed into each of the plurality of axial openings 114, 114' . . . 114" until a head 29 on each bolt 28 engages the inboard face 118 of mounting flange 110. The radial groove 122 defines a receptacle for any distorted material 121 that results from the pushing of a mounting stud or bolt 28 into the radial flange 110. The depth defines an outer peripheral surface 136. The disc member 132 has an alignment surface 138 that is perpendicular to and adjacent the inner peripheral surface 134 that extends a distance from the axis of the rotor 130 sufficient to define a drum for a parking brake of a type disclosed in U.S. Pat. No. 6,360,852 while that portion of the rotor 130 adjacent the outer peripheral surface 136 defines first 140 and second 142 opposing friction surfaces. The first 140 and second 142 opposing friction surfaces are perpendicular to the inner peripheral surface and parallel with the alignment surface 138 such that when the inner peripheral surface 134 is thereafter located on the rotor pilot surface 152 of the wheel hub assembly 160 the plurality of bolts or studs 28, 28 . . . 28" correspondingly extend through the second plurality of axial openings 214, 214' . . . 214" herein. At this point of processing, a retainer 29 could be pushed on the stud 28 to keep the rotor 130 attached to the hub assembly 160 for further evaluation.

Figure 6:
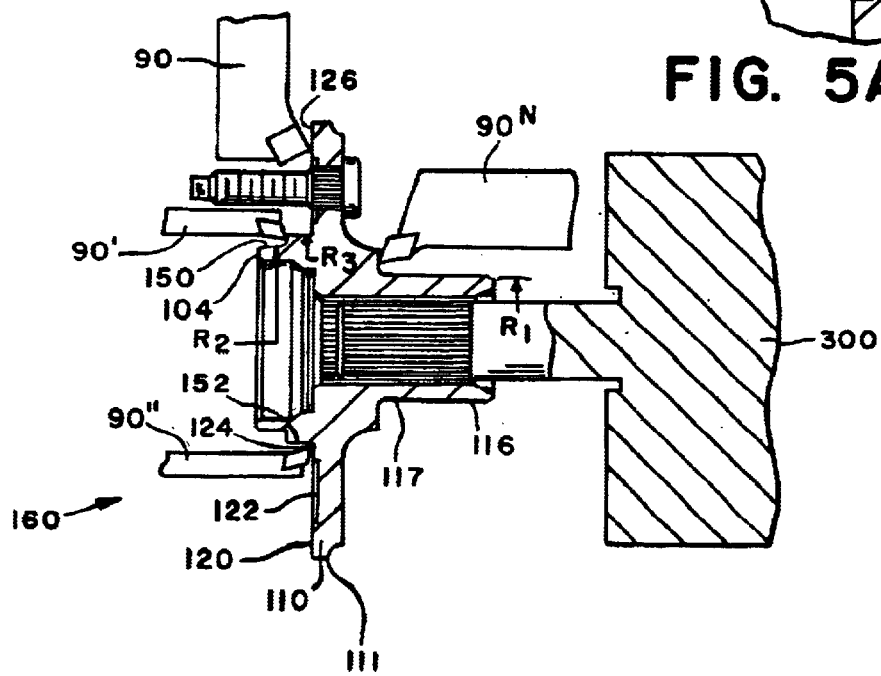
FIG. 6 illustrates a third step wherein the wheel hub of FIG. 4 is places on an arbor and machined to obtain desired surface relationships between the flange and a journal with respect to the axis of the wheel hub to define a wheel hub assembly of the present invention.

The wheel hub 100 with mounting studs 28,28 . . . 28" secured to mounting flange 110 is returned to a station as illustrated in FIG. 6 to complete the step of machining by a plurality of single point tools 90,90 . . . 90" that are applied to various surfaces thereon. In particular the journal section 116, the out board face 120 of the mounting flange 110 and the cylindrical body 102 adjacent the first end 104 are machined to remove material there from to define a wheel pilot surface 150 adjacent the first end 104, a rotor pilot surface 152 adjacent the wheel pilot surface 150, a bearing surface 117 in the journal section 116, the first radial face 124 that extends from the rotor pilot surface 152 to the radial groove 122 and the second radial face 126 that extends from the radial groove 122 on the out board surface 120 to the peripheral surface 111 on the mounting flange 110. The final machining is such that the bearing surface 117 has a radius $r_1$; the rotor pilot surface 152 has a radius $r_2$, and the wheel pilot surface 150 has a radius $r_3$ with respect to the splined axial bore 108 that are concentric while the first 124 and second 126 radial faces are perpendicular to the axially splined axial bore 108 in the finished a hub assembly 160. The concentricity of the wheel pilot surface 150, rotor pilot surface 152 and bearing surface 117 are more accurate since they are all machined by tools 90,90' . . . 90" during a same operation to define the wheel hub assembly 160.

The corner assembly 200 includes a knuckle or anchor member 202 with a bearing 210 located in an axle opening 220. The bearing 210 is pressed in the opening 220 until the outer race 221 engages flange 224 and a snap ring 226 is inserted into groove 228 to retain the bearing 210 the knuckle 202.

Figure 7:
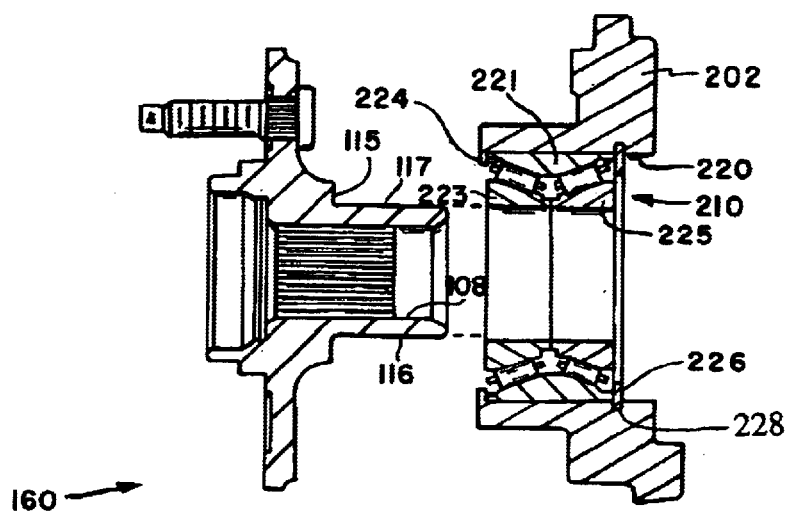
FIG. 7 illustrates a fourth step wherein the journal for a bearing on the wheel hub assembly is pressed the bearing retained in a knuckle member.

The wheel hub assembly 160 is brought to a station, illustrated in FIG. 7, and pressed into bearing 210 such that a base 115 of bearing surface 117 in journal section 116 engages the face 223 of the inner race 225. As a result of the pressing operation at this station, the splined axial bore 108 of the wheel hub 160 and the rails on knuckle 202 that guide the backing plate for the first and second friction pads are in parallel alignment.

Figure 8:
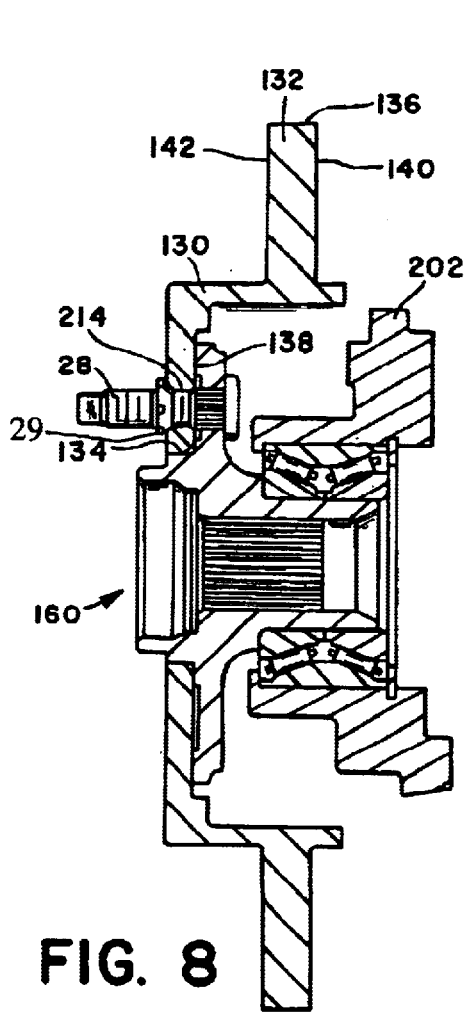
FIG. 8 illustrates a fifth step wherein a rotor is placed on a the wheel hub assembly and brought into engagement with the flange on the hub assembly of FIG. 7.

The knuckle 202 with the wheel hub assembly 160 attached thereto is now moved to a new station, illustrated in FIG. 8, where a rotor 130 is obtained from a source. Rotor 130 is characterized by a disc member 132 having a inner opening with a radius that defines an inner peripheral surface 134 and an outer radius that defines an outer peripheral surface 136. The disc member 132 has an alignment surface 138 that is perpendicular to and adjacent the inner peripheral surface 134 that extends a distance from the axis of the rotor 130 sufficient to define a drum for a parking brake of a type disclosed in U.S. Pat. No. 6,360,852 while that portion of the rotor 130 adjacent the outer peripheral surface 136 defines first 140 and second 142 opposing friction surfaces. The first 140 and second 142 opposing friction surfaces are perpendicular to the inner peripheral surface and parallel with the alignment surface 138 such that when the inner peripheral surface 134 is thereafter located on the rotor pilot surface 152 of the wheel hub assembly 160 the plurality of bolts or studs 28,28 . . . 28" correspondingly extend through the second plurality of axial openings 214, 214' . . . 214" therein. At this point of processing, a retainer 29 could be pushed on the stud 28 to keep the rotor 130 attached to the hub assembly 160 for further evaluation.

The corner assembly 200 is completed on a vehicle when a wheel 250 having third plurality of openings 254, 254' . . . 254" that surround a center opening 252 is attached to the wheel hub 160. The wheel 250 is placed on the wheel pilot surface 150 with the plurality of bolts or studs 28,28 . . . 28" extending through the third plurality of openings 254, 254' . . . 254" in the wheel 250. Lug nuts 27 would then be attached to each of the plurality of bolts or studs 28,28 . . . 28" to bring the alignment surface 138 on rotor 130 into engagement with the first 124 and second 126 radial faces on the mounting flange 110 to align the first 140 and second 142 opposing friction surfaces in a plane perpendicular to the axis of the hub assembly 160 to define a corner assembly 200.

In order to check the lateral runout which is recognized as a deflection from a parallel plane by a rotor 130 during a revolution of rotation, an knuckle 202 with the rotor 130 located on the wheel hub assembly 160 is transferred to a station where the lateral runout is gaged. A gage is mounted to contact the first 140 and second 142 opposing friction surfaces adjacent the peripheral surface 136. The wheel hub assembly 160 is then rotated causing the rotor 130 to also rotate and any change in the perpendicular alignment with respect to the axis of the wheel hub assembly 160 is recorded. If a measured lateral change "x" is less than 0.06 mm, the rotor 130 and knuckle 202 with the wheel hub assembly 160 is accepted for installation on a vehicle. However, if a lateral change "x" of more than 0.06 mm is measured the knuckle 202 with the wheel hub assembly 160 and/or rotor 130 are initially rejected because it most likely would produce unwanted braking feel when installed on a vehicle.

While the rotor 130 and wheel hub assembly 160 may individually be within manufacturing tolerance, the limits of the tolerance may contribute to a lateral runout or change that is greater than 0.06 mm. In an attempt to cancel a cumulative effect of such manufacturing tolerances, the rotor 130 is removed from the wheel hub assembly 160, given a partial turn and remounted on the rotor pilot surface 152 such each bolt or stud 28,28 . . . 28" now correspondingly extend through a different opening such the following sequential alignment 214" . . . 214", 214. The rotor 130 is again brought into engagement with the first 124 and second 126 radial faces on the mounting flange 110 to align the first 140 and second 142 opposing friction surfaces in a plane perpendicular to the axis of the hub assembly 160 to simulate a corner assembly 200 installation on a vehicle. The wheel hub assembly 160 and correspondingly rotor 130 are again rotated and lateral change is again gaged. If a measured lateral "x" change is less than 0.06 mm the knuckle 202 with the wheel hub assembly 160 and rotor 130 are now accepted for installation on a vehicle. However, if a lateral change "x" of more than 0.06 mm is measured, the rotor 130 alone may be the reason a desired limit for lateral runout is achieved.

The sequential processing of the wheel hub assembly 160 defined above should be sufficient to achieve the desired lateral run out, however should run out be greater that the desired limit occur, rather than scrap the knuckle 202 with the wheel hub assembly 160 attached thereto, rotor 130 is removed from the wheel hub assembly 160 and replaced with a second rotor 130*a*. The second rotor 130*a* is placed on the rotor pilot 152 and alignment surface 138 on rotor 130*a* is brought into engagement with the first 124 and second 126 radial faces on the mounting flange 110 to align the first 140 and second 142 opposing friction surfaces in a plane perpendicular to the axis of the hub assembly 160. The gaging is repeated by rotating the wheel hub assembly 160 to gage the expected lateral change "x" of the first 140 and second 142 opposing friction surfaces during a revolution of rotation of rotor 130*a*. If a measured lateral change "x" is less than 0.06 mm, the reassembled knuckle 202 with the wheel hub assembly 160 with rotor 130*a* is now accepted for installation on a vehicle. If a lateral change "x" of more than 0.06 mm is measured, the rotor 130*a* removed and rotated such that bolt or studs 28,28 . . . 28″ now extend through a different opening, such the following sequential alignment 214″ . . . 214″, 214, and the gaging repeated. Now if a lateral change "x" as measured is more than 0.06 mm, the knuckle 202 with wheel hub assembly 160 is considered as being outside of a range for desire lateral runout and finally rejected.

We claim:

1. A process for manufacturing a corner assembly for a vehicle including a wheel hub and brake component, comprising the steps of:

obtaining a wheel hub from a source, said wheel hub being defined by a cylindrical body with a first end and a second end, an axial bore that extends from the first end to the second end, a radially extending mounting flange located between said first end and said second end, and a plurality of axial openings in the mounting flange each having a first diameter that is located a fixed radial distance from the axis of said axial bore;

placing the wheel hub in an arbor and rotating the wheel hub to partially finish the cylindrical body to define a journal section that extends from said second end toward said mounting flange and to partially finish said mounting flange to define an inboard face toward said journal section and an out board face toward said first end;

machining a radial groove in said out board face of said mounting flange, said groove having a width that exceeds said first diameter of said plurality of openings in said mounting flange;

pressing a bolt in each of said plurality of axial openings in said flange of said wheel hub to bring a head of each bolt into engagement with said inboard face of said mounting flange;

placing said wheel hub in the arbor and rotating said wheel hub to finish machining said journal section and said out board face of said mounting flange by removing material therefrom to define a wheel pilot surface adjacent said first end, a rotor pilot surface adjacent said wheel pilot surface, a bearing surface in said journal section, a first radial face that extends from said rotor pilot surface to said radial groove and a second radial face that extends from said radial groove on said out board face to a peripheral surface on said mounting flange such that said wheel pilot surface, rotor pilot surface and bearing surface are concentric to said axial bore and said first and second radial faces are perpendicular to said axial bore to define a wheel hub assembly;

pressing said wheel hub assembly into a bearing retained in a support member that is fixed to a vehicle;

obtaining a first rotor from a source, said first rotor being defined by a second plurality of openings located adjacent an inner peripheral surface, an alignment surface adjacent said inner peripheral surface and first and second opposing friction surfaces located adjacent an outer peripheral surface with the first and second opposing friction surfaces being perpendicular to said inner peripheral surface, said inner peripheral surface is thereafter located on said rotor pilot surface of said wheel hub assembly such that said plurality of bolts correspondingly extend through said second plurality of openings;

obtaining a wheel from a source and locating a center opening of the wheel is on said wheel pilot surface with said plurality of bolts extending through a corresponding third plurality of openings in said wheel; and attaching nuts to said plurality of bolts to bring said alignment surface on said first rotor into engagement with said first and second radial faces on said mounting flange to align said first and second opposing friction surfaces in a plane perpendicular to said axis of said hub assembly to define said corner assembly.

2. The process as recited in claim 1 further including the step of:

rotating said wheel hub to evaluate the perpendicular alignment of said first and second opposing friction surfaces with respect to said axis of said wheel hub by gaging any lateral change in said rotor during a revolution of rotation;

accepting a support member with the wheel hub attached thereto and a rotor when the lateral change is less that 0.06 mm; and initially rejecting the knuckle support member with the wheel hub attached thereto and the rotor when the lateral change is more than 0.06 mm.

3. The process as recited in claim 2 further including the step of:

removing said first rotor from said wheel hub when a lateral change is more than 0.06 mm and thereafter relocating said third plurality of openings differently on said plurality of bolts;

rotating said wheel hub to repeat the gaging of said rotor to detect lateral change;

thereafter accepting the support member with the wheel hub attached thereto and the when the lateral change is less that 0.06 mm; and finally rejecting the rotor when the lateral change is more than 0.06 mm.

4. The process as recited in claim 3 further including the step of:

removing said rejected rotor from said wheel hub and obtaining a second rotor said source;

placing said second rotor on the rotor pilot surface of the wheel hub to bring an alignment surface thereon into engagement with said first and second radial surfaces on said wheel hub;

rotating said wheel hub to repeat the gaging of said second rotor to define lateral change during a revolution of rotation;

accepting the support member with said wheel hub attached thereto and said second rotor when a measured lateral change is less that 0.06 mm; and rejecting said support member with said wheel hub attached thereto and second rotor when the lateral change is more than 0.06 mm.

5. The process as recited in claim 4 further including the step of:

removing said second rotor from said wheel hub when the lateral change is more than 0.06 mm and thereafter relocating said third plurality of openings therein differently on said plurality of bolts;

rotating said wheel hub repeat the gaging of said second rotor to detect lateral change;

thereafter accepting the support member with the wheel hub attached thereto and the second rotor when the lateral change is less that 0.06 mm; and finally rejecting said support member with the wheel hub attached thereto and the second rotor when the lateral change is more than 0.06 mm.

* * * * *